United States Patent [19]

Lang

[11] Patent Number: 4,589,316

[45] Date of Patent: May 20, 1986

[54] MACHINE TO PRODUCE MAT WITH VALVES THEREIN

[75] Inventor: Aage Lang, Kolind, Denmark

[73] Assignee: Clean-Tex A/S, Morke, Denmark

[21] Appl. No.: 695,683

[22] Filed: Jan. 28, 1985

[51] Int. Cl.[4] .......................... B23D 25/12; B23B 3/02

[52] U.S. Cl. .......................................... 83/289; 83/305; 83/660; 83/678; 428/92; 428/95; 428/134; 428/136; 425/150; 425/169

[58] Field of Search ................. 83/289, 304, 305, 660, 83/678, 332, 867, 30; 428/92, 136, 134, 95, 132, 137; 425/29

[56] References Cited

U.S. PATENT DOCUMENTS

| | | | |
|---|---|---|---|
| 769,444 | 9/1904 | Meurell | 83/867 X |
| 2,762,433 | 9/1956 | Russell | 83/660 X |
| 3,427,912 | 2/1969 | Nozawa et al. | 83/332 X |
| 3,451,358 | 6/1969 | Ruiz | 83/660 X |
| 3,461,502 | 8/1969 | Turk et al. | 425/29 |
| 3,730,821 | 5/1973 | Jackson | 428/136 X |
| 4,058,041 | 11/1977 | Ito | 83/305 |
| 4,167,130 | 9/1979 | Miller | 83/678 X |
| 4,167,131 | 9/1979 | Habas et al. | 83/304 |
| 4,326,909 | 4/1982 | Slavik | 83/30 X |
| 4,379,189 | 4/1983 | Platt | 428/92 X |
| 4,439,475 | 3/1984 | Lang | 428/134 X |
| 4,528,229 | 7/1985 | Gottlieb | 428/95 X |

*Primary Examiner*—J. Howard Flint, Jr.

*Attorney, Agent, or Firm*—Earle R. Marden; H. William Petry

[57] ABSTRACT

A machine and method to operate the machine to provide a plurality of valve-like perforations in the rubber-like backing of a nap mat or carpet by delivering the nap mat or carpet to and under a spiked roll. The machine includes a sensing device to ensure the leading and trailing edges of the nap mat are not perforated by the spiked roll.

4 Claims, 3 Drawing Figures

MACHINE TO PRODUCE MAT WITH VALVES THEREIN

This invention relates to a machine to produce a nap mat or carpet of the type disclosed in U.S. Pat. No. 4,439,475 which has a rubber-like backing in which there are a plurality of perforations therein which are normally closed in use and are opened during washing or cleaning thereof by the appliction of a pressing force on the face side thereof.

It is therefore an object of the invention to provide a machine to efficiently produce a nap mat or carpet which has a plurality of valve-like perforations in the rubber-like backing thereof.

Other objects and advantages of the invention will become readily apparent as the specification proceeds to describe the invention with reference to the accompanying drawings, in which.

Figure 1:
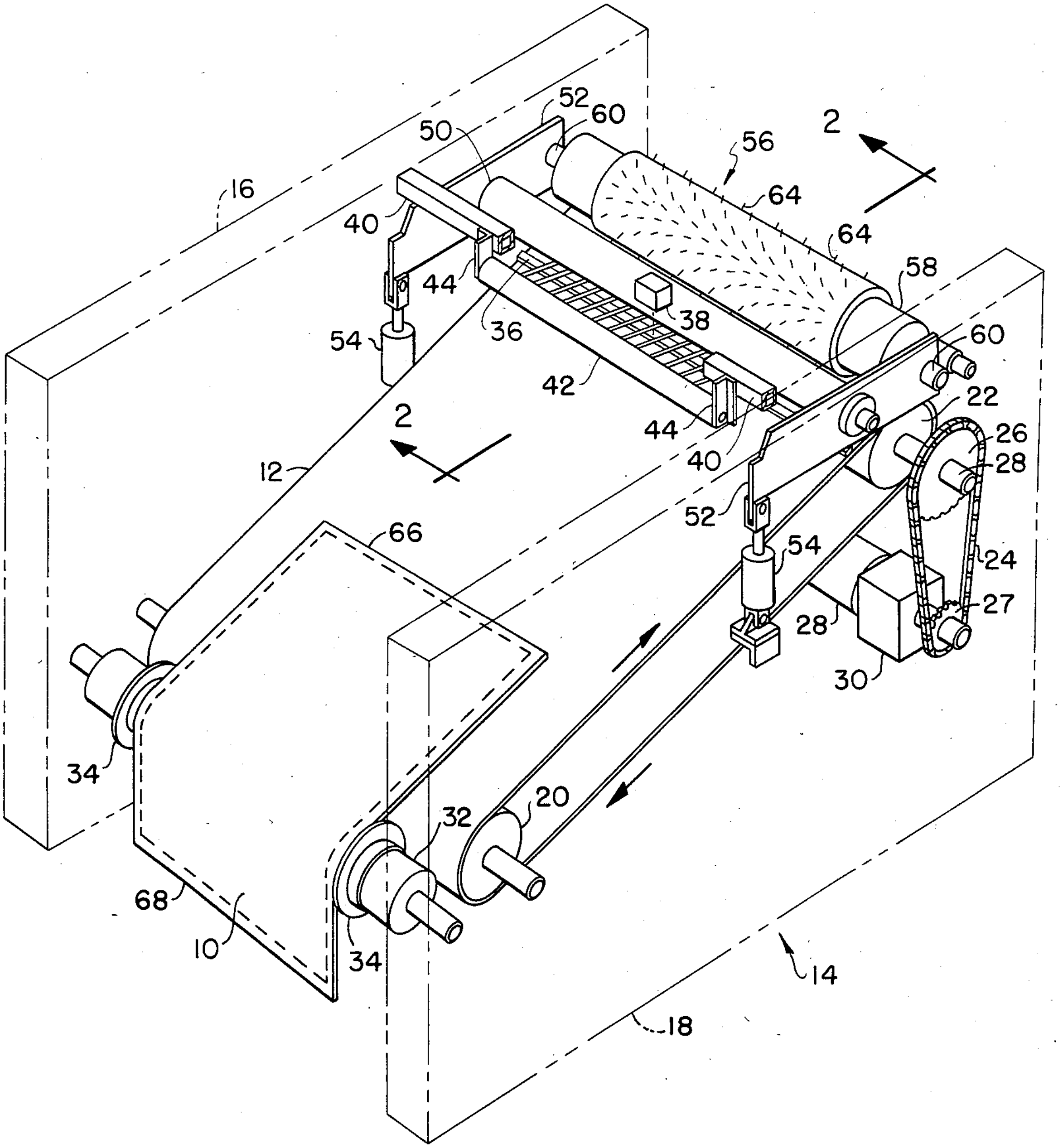
FIG. 1 is a perspective view of the improved valve producing machine.
Figure 2:
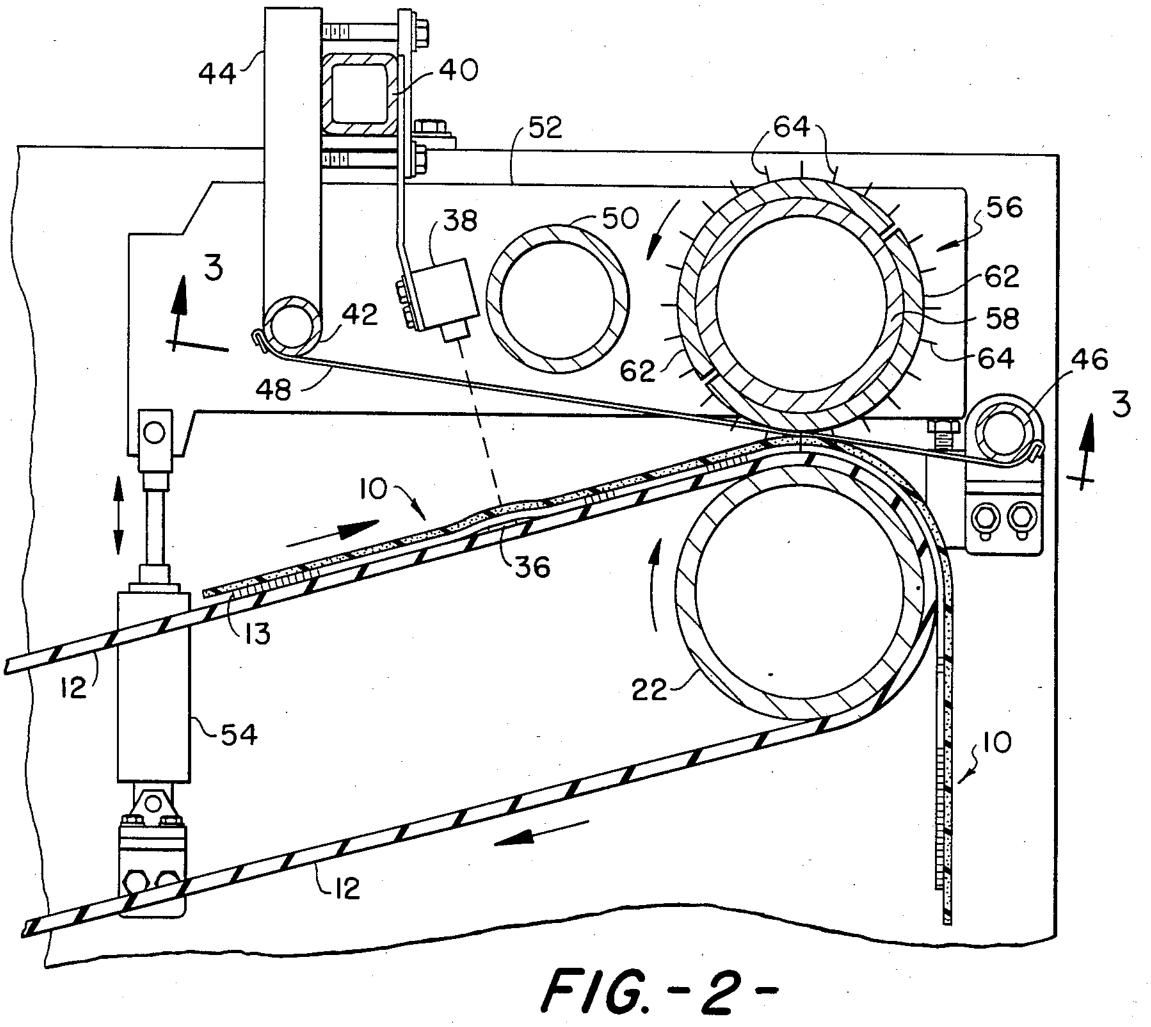
FIG. 2 is a cross-section view of the new machine taken on line 2—2 of FIG. 1

Looking now to the drawings the nap mat or carpet 10 is shown on the endless conveyor belt 12 with its pile face 13 down and the backing of rubber-like material facing upward. The mat or carpet 10 is of the type having a pile surface 13 on one side and a rubber or rubber-like backing and preferably with the pile surface being formed by tufting through an intermediate non-woven layer of natural or synthetic fibers.

The machine, generally designated 14 is supported, basically, by the side supports 16 and 18. The endless conveyor 12 is supported by idler roll 20, supported by suitable bearings in the side support 16 and 18, and is driven by roll 22. Roll 22 is driven by a sprocket chain 24 engaging the gear 26 on the shaft 28 of the roll 22. The chain 24 is driven by a suitable gear 27 driven by motor 28 through a gear box 30.

Mounted between the side supports 16 and 18 in suitable bearings is an inlet idler roll 32 which has guide members 34 slidably supported thereon to provide correct positioning of the desired width mat 10 on the conveyor belt 12. Mounted to the side support members 16 and 18, upstream of the inlet roll and adjacent the conveyor belt 12, is a reflective tape 36 of suitable material which cooperates with the photo-electric eye 38 for reasons hereinafter explained.

Mounted between and secured to the side support members 16 and 18 is a rectangular bar member 40 which supports the fixed roll 42 by means of suitable brackets 44. Mounted between the side supports 16 and 18 on the outlet of the machine 14 is another fixed roll 46 cooperating with the roll 42 to provide support for the spaced ¼" stainless steel bands 48 extended therebetween and connected thereto by suitable screws or rivets 49.

Also mounted between the side support member 16 and 18 by shaft 48 is the pivot roll 50. Pivot roll 50 is connected at both ends to pivot members 52 which are connected to air cylinders 54 at one end and support the spiked roll 56 at the other end. Spiked roll 56 is mounted above and in line with the driven roll 22.

Spiked roll 56 basically consists of a support roll 58, end shafts 60 and half-moon sleeves 62 with pins or spikes 64 therethrough. In the preferred form of the invention, the sleeves 62 are approximately 10 mm in thickness and the pins are 3 mm in diameter press fitted into the sleeve 62. The length of the sleeves is dependent on the desired width of mat 10 to be formed with valves.

Figure 3:
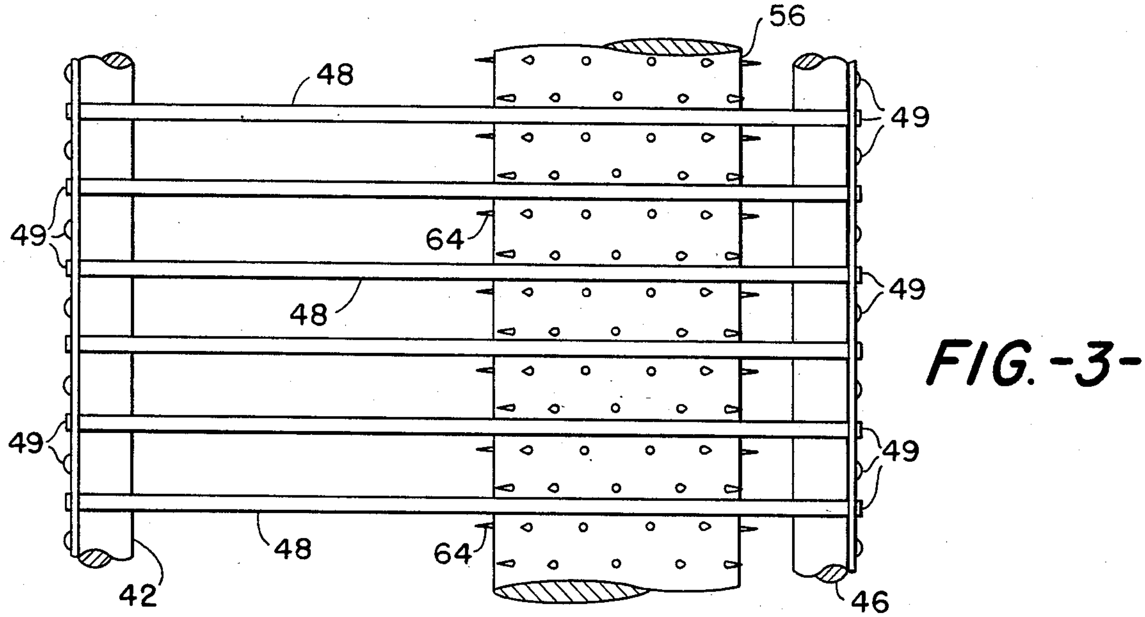
FIG. 3 is a bottom view of the spiked roll looking in the direction noted by line 3—3 of FIG. 2.

Looking at FIG. 3 the adjacent pins 64 in each row are spaced equidistant from the next pin with each adjacent row being spaced across the roll a distance equal to ½ the spacing between adjacent pins in each row. The pins in adjacent rows are also staggered a distance equal to ½ the distance between adjacent rows forming with the pins in the next adjacent row a diamond configuration. The bands 48 are preferably located between every other row so that the centerline distance between bands is equal to the spacing between adjacent pins in each row.

As previously discussed, it is desired to provide valve-like perforations in the rubber-like backing material of the carpet or mat 10. This is accomplished by selecting a pin size which makes a very small opening in the backing material that immediately closes up after removal of the pin from the perforation. This is opposed to actually cutting out material to provide a permanent hole or holes in the backing material. This provides a carpet or mat 10 that has perforations which are closed when the mat is placed down at the point of use but which opens up when centrifuged in a washer to allow water to the expelled therethrough. In this sense the perforations with the rubber-like backing material form valves in the back of the mat 10 allowing the mat 20 to be substantially de-watered or dried without the application of heat thereto.

OPERATION

As shown in FIG. 1 the mat 10 is of the type which has a border around the pile surface 13 which, obviously does not need or require perforations therein. The mat 10 is placed by the operation between the guides 34 onto the conveyor belt 12. The mat travels, in the direction indicated, toward the spiked roll 56. When the leading edge 66 of the mat 10 blocks the reflective tape 36 from the photo cell 38, the circuit to actuate the air cylinders 54 is actuated. The circuit for the air cylinders 54 include a time delay to allow the leading border of the mat 10 to pass under the spiked roll before the roll 56 is brought into contact with the mat 10. When the time delay has timed out the circuit, not shown, energizes an air valve to supply air to the cylinder 54 to pivot the pivot member 52 in the clockwise direction to place the pins 64 of the spiked roll into intimate contact the mat 10. The pins 64 pass completely through the mat 10 into the belt 12 a distance equal to about ⅜ the thickness of the belt. This ensures that the required performation is made in the backing material of the mat 10. As the mat progresses through the nip of roll 22 and 56 the bands 48 guide the perforated portion of the mat away from the pins 64 of the roll 56 to prevent the mat 10 from lapping around the spiked roll 56. When the trailing edge 68 of the mat 10 clears the reflective tape 36 the photo-cell 38 will de-activate the circuit for the air cylinders 54 after the time delay in the circuit has timed out to allow the remaining backing for the pile surface 13 to be perforated but prior to the passage of the trailing edge into the nip of the rolls 22 and 56. This causes the air flow on the cylinders 54 to be reversed and the pivot arms 52 will pivot counter-clockwise to raise the spiked roll 56 out of contact with the mat 10.

This operation is continuously repeated for each mat 10 placed in the endless conveyor 12.

It is obvious that the above described machine and method of operation will provide a nap mat or carpet with valve-like perforations therein in an effecient and orderly manner. The machine is compact, simple in operation and prevents damage to the nap mat or carpet being operated on.

I claim:

1. Machine to provide a plurality of valve-like perforations in the rubber-like backing of a nap mat or carpet comprising: a frame including a pair of spaced apart support members, an endless conveyor belt supported between said support members by a pair of spaced apart rolls, drive means operably associated with one said roll to rotate said endless conveyor, a perforating roll with pins on the outer surface thereof operably associated with one of said spaced apart rolls and means operably associated with said perforating roll to pivot said perforating roll into and out of close proximity to the spaced apart roll to which it is operably associated to provide valve-like openings in the rubber-like backing material of a nap mat or carpet on said endless conveyor, said means to pivot said perforating roll includes a reflective strip mounted across said endless conveyor belt and a photo-electric eye cooperating therewith.

2. The machine of claim 1 wherein said means to pivot said perforating roll further includes a time delay means operably associated with said photo-electric eye to delay the pivoting of said perforating roll for a predetermined length of time.

3. The machine of claim 1 wherein said means to pivot said perforating roll includes a roll member mounted between said support members, a second pair of spaced apart support members connected to said roll, said perforating roll being mounted to said second pair of support members at one end and an air cylinder connected to the other ends of said second pair of support members.

4. The machine of claim 4 wherein said means to pivot said perforating roll further includes a time delay means operably associated with said photo-electric eye to delay the pivoting of said perforating roll for a predetermined length of time.

* * * * *